(12) United States Patent
Kawamura

(10) Patent No.: US 7,268,507 B2
(45) Date of Patent: Sep. 11, 2007

(54) MOTOR CONTROLLER

(75) Inventor: Yoshihiro Kawamura, Shizuoka-ken (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 11/257,094

(22) Filed: Oct. 25, 2005

(65) Prior Publication Data

US 2006/0087267 A1    Apr. 27, 2006

(30) Foreign Application Priority Data

Oct. 26, 2004    (JP) ............................. 2004-311103

(51) Int. Cl.
- *H02K 7/10* (2006.01)
- *H02K 17/32* (2006.01)
- *H02K 23/68* (2006.01)
- *H02K 27/30* (2006.01)
- *H02P 3/00* (2006.01)

(52) U.S. Cl. .................... 318/364; 318/86; 318/703
(58) Field of Classification Search ................ None
See application file for complete search history.

(56) References Cited

U.S. PATENT DOCUMENTS 5,355,061 A * 10/1994 Forhan .................. 318/443
7,075,257 B2 * 7/2006 Carrier et al. .............. 318/375

FOREIGN PATENT DOCUMENTS

JP          6-343030          12/1994

* cited by examiner

*Primary Examiner*—Lincoln Donovan
*Assistant Examiner*—Erick Glass
(74) *Attorney, Agent, or Firm*—Finnegan, Henderson, Farabow, Garrett & Dunner, L.L.P.

(57) ABSTRACT

A DC power supply, a DC motor driven by DC voltage outputted from the DC power supply, and a control unit outputting a drive control signal to drive the DC motor are provided. A motor drive switch is provided between the DC power supply and the DC motor, and a brake switch is connected to a positive input terminal of the DC motor. The motor drive switch is on while receiving the drive control signal and outputs an output current monitor signal while current is being applied to the motor drive switch. The brake switch is configured to operate faster than the motor drive switch and is off while at least one of the drive control signal and the output current monitor signal is on. Accordingly, when the drive control signal is supplied, the brake switch is turned off, and then the motor drive switch is turned on. When the supply of the drive control signal is stopped, it is not until the motor drive switch is turned off, the current applied to the motor drive switch is stopped, and then the supply of the output current monitor signal is stopped that the brake switch is turned on.

6 Claims, 4 Drawing Sheets

MOTOR CONTROLLER

BACKGROUND OF THE INVENTION

1. Field of the Invention

The present invention relates to a motor controller which controls a DC (direct current) motor such as a wiper motor mounted on a vehicle.

2. Description of the Related Art

In a wiper mounted on a vehicle, operation of wiping a wind shield is performed by driving a wiper motor (DC motor) connected to a wiper blade. To drive and stop the wiper motor, an electronic switch to drive the wiper motor is provided between the wiper motor and a battery. To stop the wiper blade at a predetermined position of the windshield, an electronic switch to brake the motor is further provided (for example, see the Japanese Patent Laid-open Publication No. 6-343030).

FIG. 1 is a circuit diagram showing a configuration of a conventional motor controller to drive a wiper. This motor controller includes a motor drive switch SW101 and a brake switch SW102, each of which is composed of a MOSFET. The motor drive switch SW101 is disposed between a positive input terminal of a wiper motor M101 and a battery (DC power supply) B1 and switches on and off of the wiper motor M101 by controlling supply and stop of electric power to the positive input terminal of the wiper motor M101. In stopping the wiper, the brake switch SW102 grounds the positive input terminal of the wiper motor M101 to instantly stop the wiper.

The motor controller further includes a microcomputer 101 which totally controls drive and stop of the wiper by outputting to the motor drive switch SW101 a drive control signal to switch the wiper between being driven and stopped and outputting a brake signal to the brake switch SW102 in stopping the wiper.

Upon receiving a wiper drive instruction signal, the microcomputer 101 outputs the drive control signal to the motor drive switch SW101 to turn on the motor drive switch SW101 while setting the brake signal off, that is, while setting the brake switch SW102 off. Driving power is thus supplied to the wiper motor M101, and the wiper motor M101 is driven.

Thereafter, upon receiving a wiper stop instruction signal, the microcomputer 101 stops outputting the drive control signal to the motor drive switch SW101 and monitors an output current monitor signal outputted from the motor drive switch SW101 by means of an A/D converter or the like. After confirming that current flowing through the motor drive switch SW101 is shut off, the microcomputer 101 outputs the brake signal to the brake switch SW102. The brake switch SW102 is turned on, and the positive input terminal of the wiper motor M101 is grounded. The wiper motor M101 is thus instantly stopped. Therefore, the wiper blade can be stopped at a desired position.

SUMMARY OF THE INVENTION

However, in the above-described conventional motor controller, the microcomputer 101 needs to monitor the output current of the motor drive switch SW101 and make a control to turn on the brake switch after confirming that no current flows when stopping the wiper motor M101. Accordingly, the microcomputer 101 needs to include a software function to control timing.

Even if such a function to control timing is included, it can be assumed that both the motor drive switch SW101 and brake switch SW102 are on simultaneously when the microcomputer 101 runs out of control. In such a case, a so-called dead short, which directly connects the power supply voltage of the battery to the ground, occurs. Accordingly, each of the motor drive switch SW101 and brake switch SW102 is required to include an overheat protection function and to use an expensive semiconductor device.

Moreover, the microcomputer 101 requires at least two control ports to output the drive control signal and output the brake signal. In order to acquire the output current monitor signal, one more control port is required, thus causing a problem of increasing the scale of the microcomputer 101.

The present invention was made to solve the above problems, and an object of the present invention is to provide a motor controller capable of preventing both the motor driving switch and brake switch from being on simultaneously with a simple structure without increasing the scale of the controller.

To achieve the above object, a first aspect of the present invention is a motor controller including: a DC power supply; a DC motor driven by DC voltage outputted from the DC power supply; a control unit outputting a drive control signal to drive the DC motor; a motor drive switch disposed between the DC power supply and the DC motor, the motor drive switch being on while receiving the drive control signal and outputting an output current monitor signal while current is being applied to the motor drive switch; and a brake switch connected to a positive input terminal of the DC motor and operating faster than the motor drive switch. The brake switch, while being on, sets the positive input terminal and a negative input terminal of the DC motor to a same potential and is off while being supplied with at least one of the drive control signal and the output monitor signal.

According to the first aspect of the present invention, when the drive control signal is outputted from the control unit, the drive control signal is supplied to both the motor drive switch and brake switch. At this time, the brake switch is first turned off, and the motor drive switch is then turned on, since the brake switch operates faster than the motor drive switch. It is therefore possible to prevent the two switches from being on simultaneously. When the output of the drive control signal is stopped, the motor drive switch is turned off; the current applied to the motor drive switch is stopped; the output current monitor signal is turned off; and then brake switch is turned on. Accordingly, after the motor drive switch is first turned off, the brake switch is turned on. It is therefore possible to prevent the two switches from being on simultaneously. Even if the control unit has trouble, it is possible to surely prevent occurrence of trouble that the DC power supply is directly grounded.

To achieve the aforementioned object, according to a second aspect of the present invention is a motor controller including: a DC power supply; a DC motor driven by DC voltage outputted from the DC power supply; a control unit outputting a drive control signal to drive the DC motor; a motor drive switch disposed between the DC power supply and the DC motor, the motor drive switch being on while receiving the drive control signal and outputting an output current monitor signal while current is being applied to the motor drive switch; a brake switch connected to a positive input terminal of the DC motor and operating faster than the motor drive switch, the brake switch, while being on, setting the positive input terminal and a negative input terminal of the DC motor to a same potential; an OR circuit outputting a brake release signal upon receiving at least one of the drive control signal and the output current monitor signal; and a brake drive unit making a control to turn off the brake switch upon receiving the brake release signal.

According to the second aspect of the present invention, it is possible to obtain the same effect as that of the first aspect.

The brake switch may include a MOSFET not provided with the overheat protection function.

According to the above configuration, the MOSFET not provided with the overheat protection function is used as the brake switch. Accordingly, the device scale is simplified, and the cost can be reduced. This is because the two switches can be surely prevented from being on simultaneously and short-circuit current does not flow through the brake switch, thus eliminating the need for the overheat protection function.

The DC motor may be a wiper motor to drive a wiper mounted on a vehicle.

According to the above configuration, the DC motor to be controlled is the motor for driving the wiper mounted on the vehicle. Therefore, the wiping operation of the wiper can be surely switched on and off. Moreover, in turning off the wiper, the brake switch is operated, and the wiper blade can be stopped at a desired position.

DESCRIPTION OF THE PREFERRED EMBODIMENT

Figure 1:
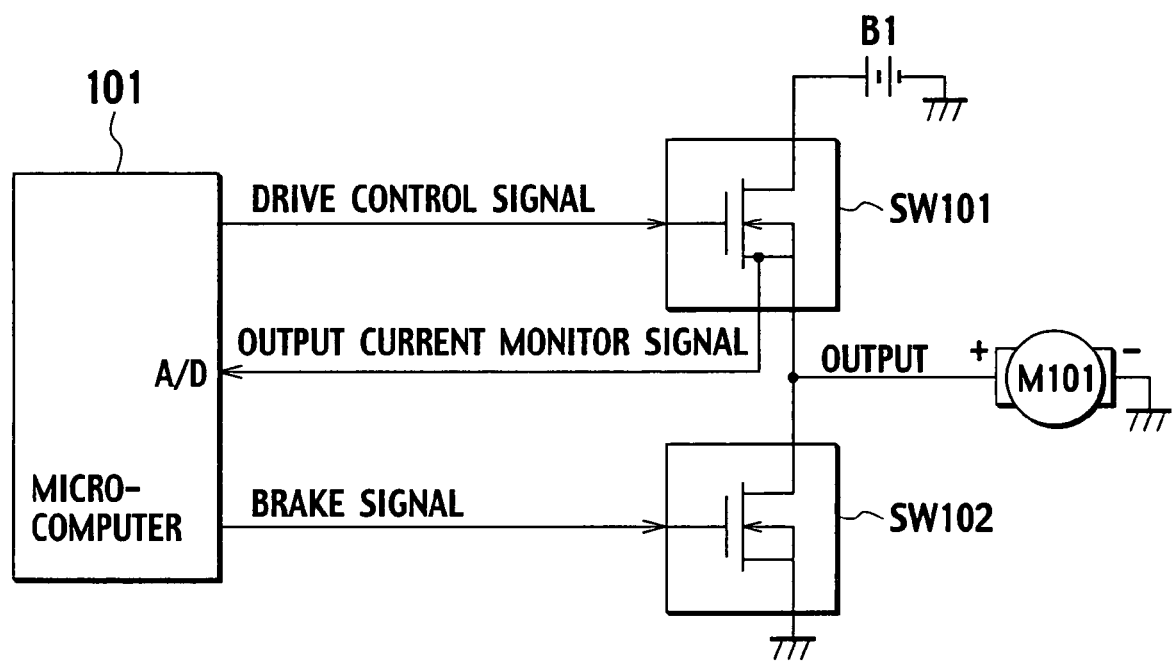
FIG. 1 is a block diagram showing a configuration of a conventional motor controller.

A description is given of an embodiment of the present invention below based on the drawings. In the following description of the drawings, same or similar portions are given same or similar reference numerals.

Figure 2:
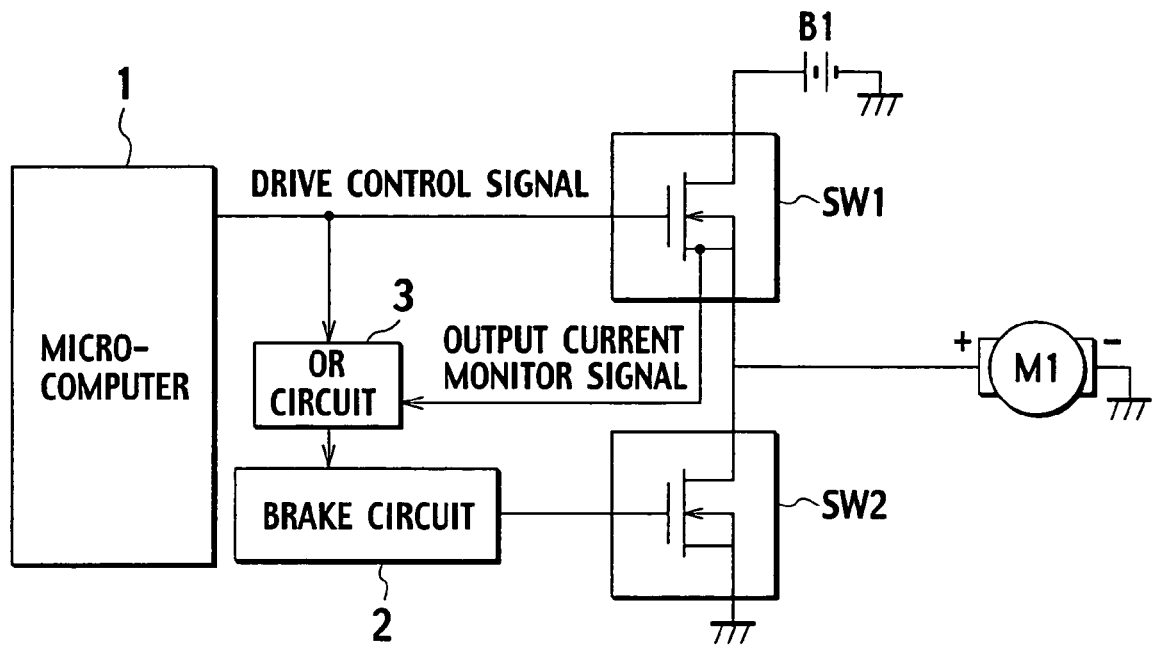
FIG. 2 is a block diagram showing a configuration of a motor controller according to an embodiment of the present invention.

FIG. 2 is a block diagram showing a configuration of a motor controller according to the embodiment of the present invention. The embodiment is described taking a motor to drive a vehicle wiper as an example of a DC motor to be controlled.

As shown in FIG. 2, the motor controller includes a motor drive switch SW1 and a brake switch SW2. The motor drive switch SW1 is disposed between a positive input terminal of a wiper motor M1 and a battery (DC power supply) B1 and switches on and off of the wiper motor M1. The motor drive switch SW1 includes a function to monitor current flowing through the switch SW1. The brake switch SW2 is disposed between the positive input terminal of the wiper motor M1 and the ground and switches between connection and disconnection between the positive input terminal and the ground (that is, between positive and negative sides of the DC motor). A negative input terminal of the wiper motor M1 is grounded.

Furthermore, the motor controller includes a microcomputer (control unit) 1, a brake circuit (brake drive unit) 2, and an OR circuit 3. The microcomputer 1 makes a control to output a drive control signal to the motor drive switch SW1 upon receiving an instruction signal to turn on a wiper. The drive control signal is to switch the wiper between being driven and being stopped. The brake circuit 2 switches on and off of the brake switch SW2. The OR circuit 3 provides a logical OR of the drive control signal outputted from the microcomputer 1 and the output current monitor signal outputted from the motor drive switch SW1.

Each of the motor drive switch SW1 and brake switch SW2 is composed of a MOSFET. The switch SW1 includes a function to monitor current and is more sophisticated than the switch SW2. Accordingly, the switch SW1, which is more sophisticated, operates slower than the switch SW2. Specifically, when the switches SW1 and SW2 are simultaneously given a control signal, the switch SW2 operates first.

Figure 3:
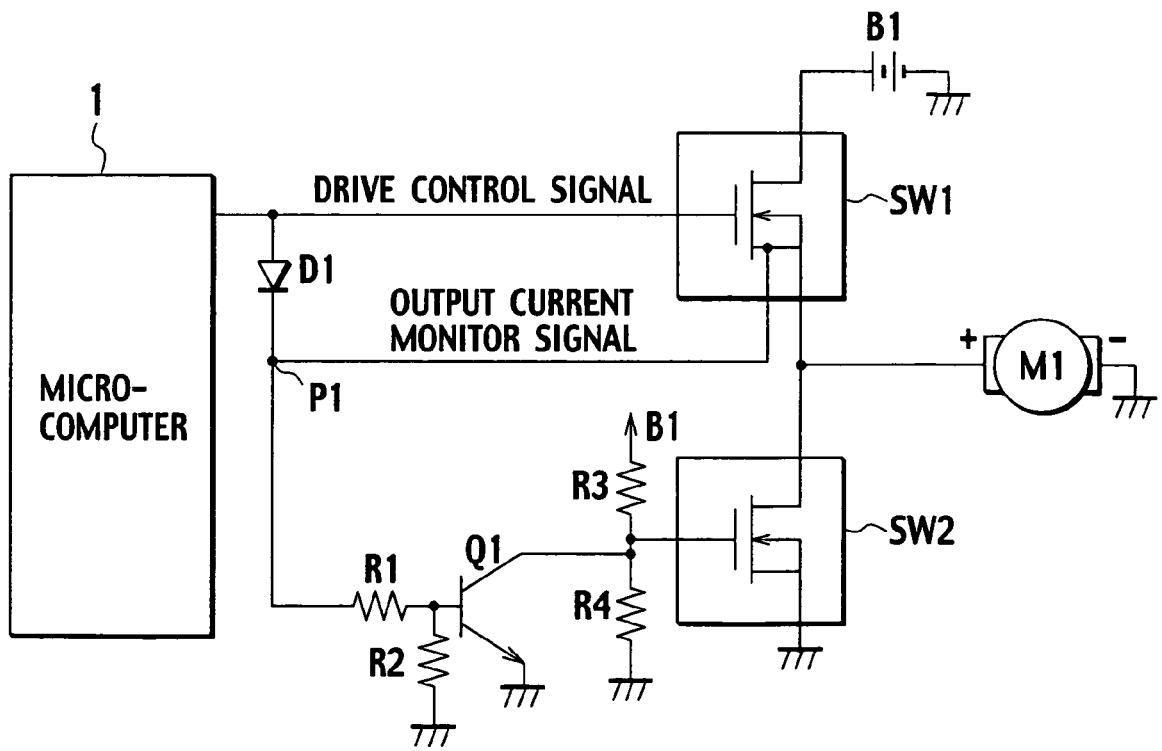
FIG. 3 is a circuit diagram showing an OR circuit and a brake circuit of the motor controller shown in FIG. 2 in detail.

FIG. 3 is a circuit diagram specifically showing the brake circuit 2 and OR circuit 3 shown in FIG. 2. The brake circuit 2 includes resistors R1 to R4 and a transistor Q1. An end of each of the resistors R2 and R4 and transistor Q1 is grounded. An output terminal of the drive control signal of the microcomputer 1 is connected to an output current monitor terminal of the motor drive switch SW1 through a diode D1 at a connection point P1, which serves as the OR circuit 3. Accordingly, voltage at the point P1 is high level while at least one of the drive control signal and output current monitor signal is outputted, and one end of the resistor R1 is pulled up to high level. In other words, the OR circuit 3 outputs a brake release signal to the brake circuit 2 while at least one of the drive control signal and output current monitor signal is high level.

Figure 4:
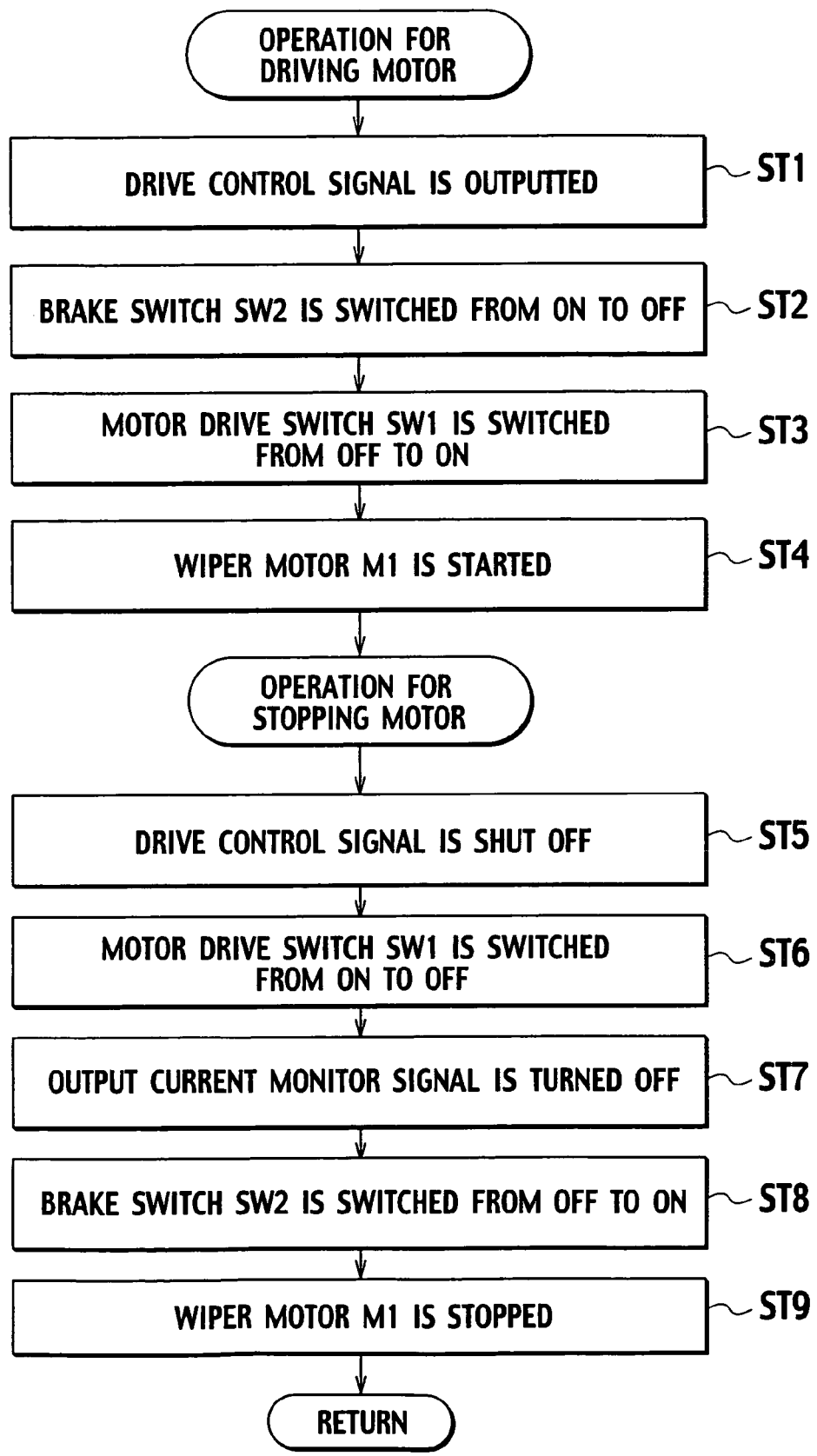
FIG. 4 is a flowchart showing an operation of the motor controller according to the embodiment of the present invention.
Figure 5:
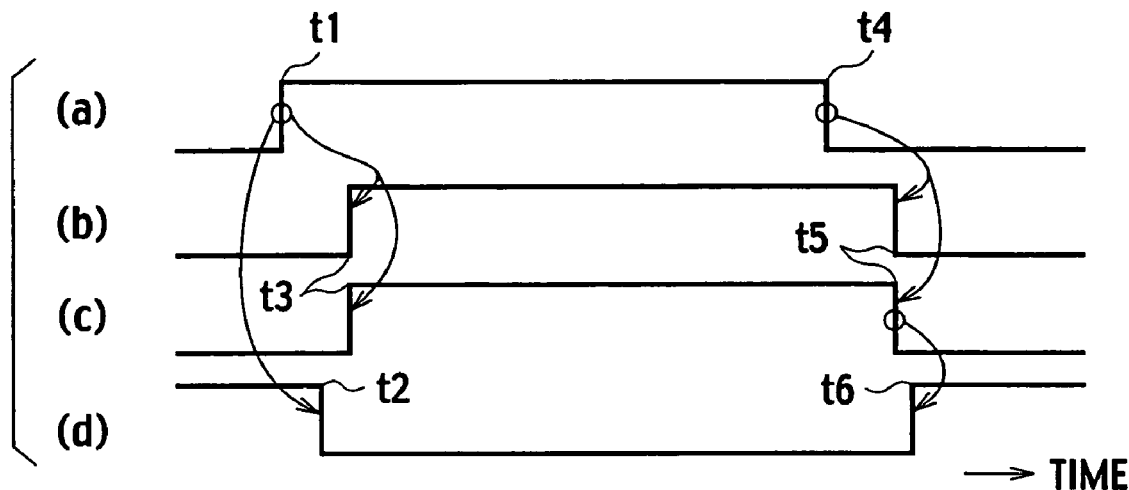
FIG. 5 is a timing chart showing the operation of the motor controller according to the embodiment of the present invention. (a) to (d) show on/off states of a drive control signal, a motor drive switch, a current monitor signal, and a brake signal, respectively. The horizontal direction represents time, and the vertical direction represents on/off states.

Next, a description is given of an action of the motor controller according to the embodiment configured as described above with reference to a flowchart shown in FIG. 4 and a timing chart shown in FIG. 5.

[Operation for Driving Motor]

First, the drive control signal is low level as an initial state while the wiper is stopped. At this time, the motor drive switch SW1 is off, and the voltage at the point P1 is low level. Accordingly, the resistor R1 is not pulled up, the transistor Q1 is off, and the brake switch SW2 is on. In other words, the positive input terminal of the wiper motor M1 is grounded, and the motor is braked.

When the wiper drive instruction signal is given to the microcomputer 1 in this state, the microcomputer 1 outputs the drive control signal to the motor drive switch SW1 (step ST1 of FIG. 4). On the other hand, one end of the resistor R1 is pulled up by the drive instruction signal outputted, and the transistor Q1 is turned on. The gate and source of the MOSFET constituting the brake switch SW2 are then short-circuited, and the brake switch SW2 is turned off (step ST2 of FIG. 4).

Herein, as described above, the MOSFET constituting the motor drive switch SW1 is more sophisticated than the MOSFET constituting the brake switch SW2, and the brake switch SW2 operates faster than the motor drive switch SW1. Accordingly, there is a slight difference between the time when the motor drive switch SW1 is turned on and the time when the brake switch SW2 is turned off, and the motor drive switch SW1 is turned on after the brake switch SW2 is turned off (step ST3 of FIG. 4).

In other words, when the drive instruction signal to operate the wiper is outputted from the microcomputer 1 at a time t1 as shown in (a) of FIG. 5, the brake switch SW2 is turned off at a time t2 as shown (d) of FIG. 5, and the motor drive switch SW1 is turned on at a time t3 a little after the time t2 as shown in (b) of FIG. 5. The output current monitor signal is outputted from the motor drive switch SW1 at the time t3 as shown in (c) of FIG. 5.

Therefore, DC drive voltage is supplied to the wiper motor M1 through the motor drive switch SW1, and the wiper motor M1 is driven for the operation to wipe the windshield (step ST4 of FIG. 4).

[Operation for Stopping Motor]

Thereafter, when a wiper stop instruction signal is given to the microcomputer 1, the drive control signal outputted from the microcomputer 1 is shut off (step ST5 of FIG. 4). One of the input signals (signal obtained through the diode D1 shown in FIG. 3) of the OR circuit 3 shown in FIG. 2 becomes low level. However, the output current monitor signal, which is the other input signal of the OR circuit 3, is still high level, and an output signal of the OR circuit 3, that is, voltage (voltage at an end of the resistor R1) at the point P1 shown in FIG. 3, is maintained at high level. Therefore, the MOSFET constituting the brake switch SW2 stays off.

Upon the drive control signal being turned off, the MOSFET constituting the motor drive switch SW1 is turned off (step ST6 of FIG. 4). The current applied to the wiper motor M1 is stopped, and the output current monitor signal is turned off (step ST7 of FIG. 4). The output of the OR circuit 3, that is, the voltage at the point P1, becomes low level, the transistor Q1 is turned off, and then the MOSFET constituting the brake switch SW2 is turned on (step ST8 of FIG. 4). The positive input terminal of the wiper motor M1 is therefore grounded to allow brake current to flow from the wiper motor M1 to the ground, and the wiper motor M1 is braked. The wiper motor M1 is thus stopped at a desired position (step ST9 of FIG. 4).

In other words, when the drive control signal is turned off at a time t4 shown in FIG. 5 to stop the wiper, the motor drive switch SW1 is turned off at a time t5. The brake switch SW2 is turned on at a time t6 a little after the time t5, and the wiper motor M1 is thus controlled to be stopped at the predetermined position.

As described above, it is possible to establish a so-called interlock system which prevents the motor drive switch SW1 and brake switch SW2 from being on simultaneously.

Figure 6:
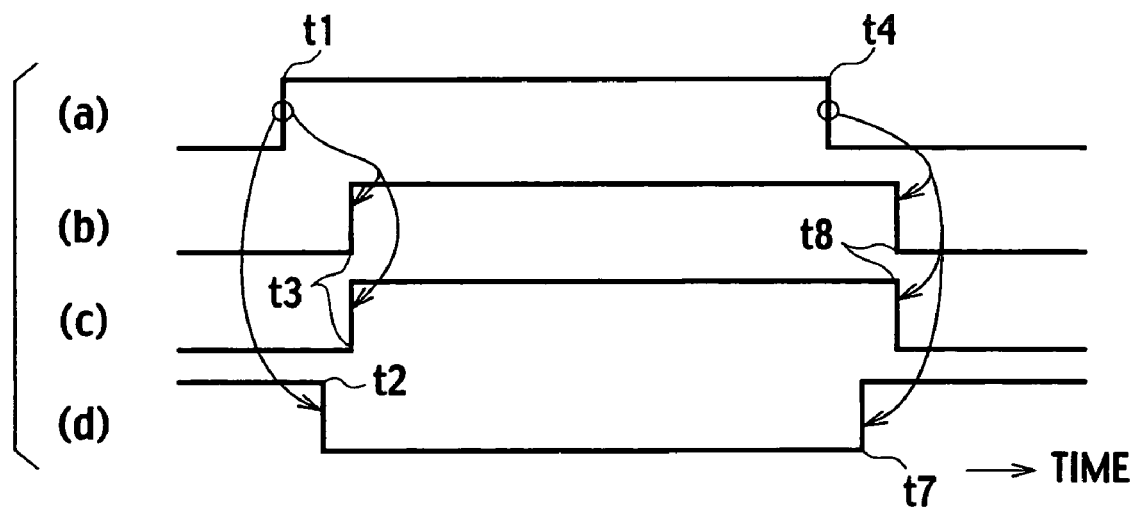
FIG. 6 is a timing chart showing the operation of a motor controller not employing the embodiment of the present invention in the case where the drive control signal and output current monitor signal are not ORed. (a) to (d) show on/off states of the drive control signal, the motor drive switch, the current monitor signal, and the brake signal, respectively. The horizontal direction represents time, and the vertical direction represents on/off states.

Herein, FIG. 6 shows a timing chart of actions of the motor drive switch SW1 and brake switch SW2 when the drive control signal is just supplied to the brake switch SW2 without using the OR circuit 3 which provides a logical OR of the drive control signal and output current monitor signal. FIG. 6 shows a case of not using the OR circuit 3 according to the embodiment of the present invention.

The actions of the motor drive switch SW1 and the brake switch SW2 in FIG. 6 are the same as those in FIG. 5 in starting of the wiper motor M1 at the times t1 to t3. However, when the drive control signal is turned off at the time t4, the brake switch SW2 is first turned on at a time t7 as shown in (d) of FIG. 6, and the motor drive switch SW1 is turned off at a time t8 a little after the time t7 as shown in (b) of FIG. 6. This is because the motor drive switch SW1 is more sophisticated than the brake switch SW2 and the switch SW2 operates faster than the switch SW1 as described above.

Accordingly, when the embodiment of the present invention is not employed, the switches SW1 and SW2 are both on between the times t7 and t8, and the battery B1 and the ground are short-circuited (dead shorted) In this embodiment, occurrence of such a short circuit is prevented by obtaining the logical OR of the drive control signal and output current monitor signal to control the brake circuit.

Arrows shown in FIGS. 5 and 6 explain the above description in terms of which signal or switch is turned on/off upon each of the signals and switches being turned on/off. In the start of the wiper motor M1 at the times t1 to t3, both FIGS. 5 and 6 indicate by means of the arrows the state where the brake switch SW2 shown in (d) is turned off upon the drive control signal shown in (a) being turned on. However, when the drive control signal is turned off at the time t4, the arrows of FIGS. 5 and 6 are different from each other. FIG. 5 shows that it is not until the current monitor signal shown in (c) is turned off that the brake switch SW2 shown in (d) is turned on. On the other hand, in FIG. 6, the brake switch SW2 shown in (d) is turned on upon the drive control signal shown in (a) being turned off.

As described above, in the motor controller according to the embodiment of the present invention, when the drive control signal is given by the microcomputer 1, because of the difference in operation speed between the motor drive switch SW1 and brake switch SW2, the brake switch SW2 is first turned off, and then the motor drive switch SW1 is turned on. Moreover, when the drive control signal is shut off, the switch SW1 is first turned off, and the switch SW2 is then turned on after the output current monitor signal is turned off.

It is therefore possible to prevent both the switches SW1 and SW2 from being on simultaneously. Even if there is trouble in the control operation of the microcomputer 1, it is possible to surely prevent occurrences of short circuit trouble between the battery B1 and the ground.

Moreover, the microcomputer 1 is connected to the switches SW1 and SW2 at the single point and requires only one control port. The number of input and output pins provided for the microcomputer 1 can be therefore reduced.

Furthermore, since it is possible to assuredly prevent short-circuit current from flowing through the brake switch SW2, the MOSFET constituting the brake switch SW2 can be a MOSFET not provided with the overheat protection function. Accordingly, the configuration thereof can be simplified, and the cost can be reduced.

In the aforementioned embodiment, the description is given taking as an example the case where the DC motor to be controlled is the motor to drive the vehicle wiper. However, the present invention is not limited to this and can be applied to, in addition to the wiper motor, any motor as long as the motor is provided with a brake switch to stop the motor at a desired position.

The present invention is described by the embodiment in the above description but not limited to this. The configuration of each member can be replaced with any configuration including a similar function.

What is claimed is:

1. A motor controller, comprising:
   a DC power supply;

a DC motor driven by DC voltage outputted from the DC power supply;

a control unit outputting a drive control signal to drive the DC motor;

a motor drive switch disposed between the DC power supply and the DC motor, the motor drive switch being on while receiving the drive control signal and outputting an output current monitor signal while current is being applied to the motor drive switch; and a brake switch connected to a positive input terminal of the DC motor and operating faster than the motor drive switch, the brake switch, while being on, setting the positive input terminal and a negative input terminal of the DC motor to a same potential and being off while being supplied with at least one of the drive control signal and the output monitor signal.

2. A motor controller, comprising:

a DC power supply;

a DC motor driven by DC voltage outputted from the DC power supply;

a control unit outputting a drive control signal to drive the DC motor;

a motor drive switch disposed between the DC power supply and the DC motor, the motor drive switch being on while receiving the drive control signal and outputting an output current monitor signal while current is being applied to the motor drive switch;

a brake switch connected to a positive input terminal of the DC motor and operating faster than the motor drive switch, the brake switch, while being on, setting the positive input terminal and a negative input terminal of the DC motor to a same potential;

an OR circuit outputting a brake release signal upon receiving at least one of the drive control signal and the output current monitor signal; and a brake drive unit making a control to turn off the brake switch upon receiving the brake release signal.

3. The motor controller according to claim 1, wherein the brake switch includes a MOSFET not provided with an overheat protection function.

4. The motor controller according to claim 2, wherein the brake switch includes a MOSFET not provided with an overheat protection function.

5. The motor controller according to claim 1, wherein the DC motor is a wiper motor to drive a wiper mounted on a vehicle.

6. The motor controller according to claim 2, wherein the DC motor is a wiper motor to drive a wiper mounted on a vehicle.

* * * * *